UNITED STATES PATENT OFFICE.

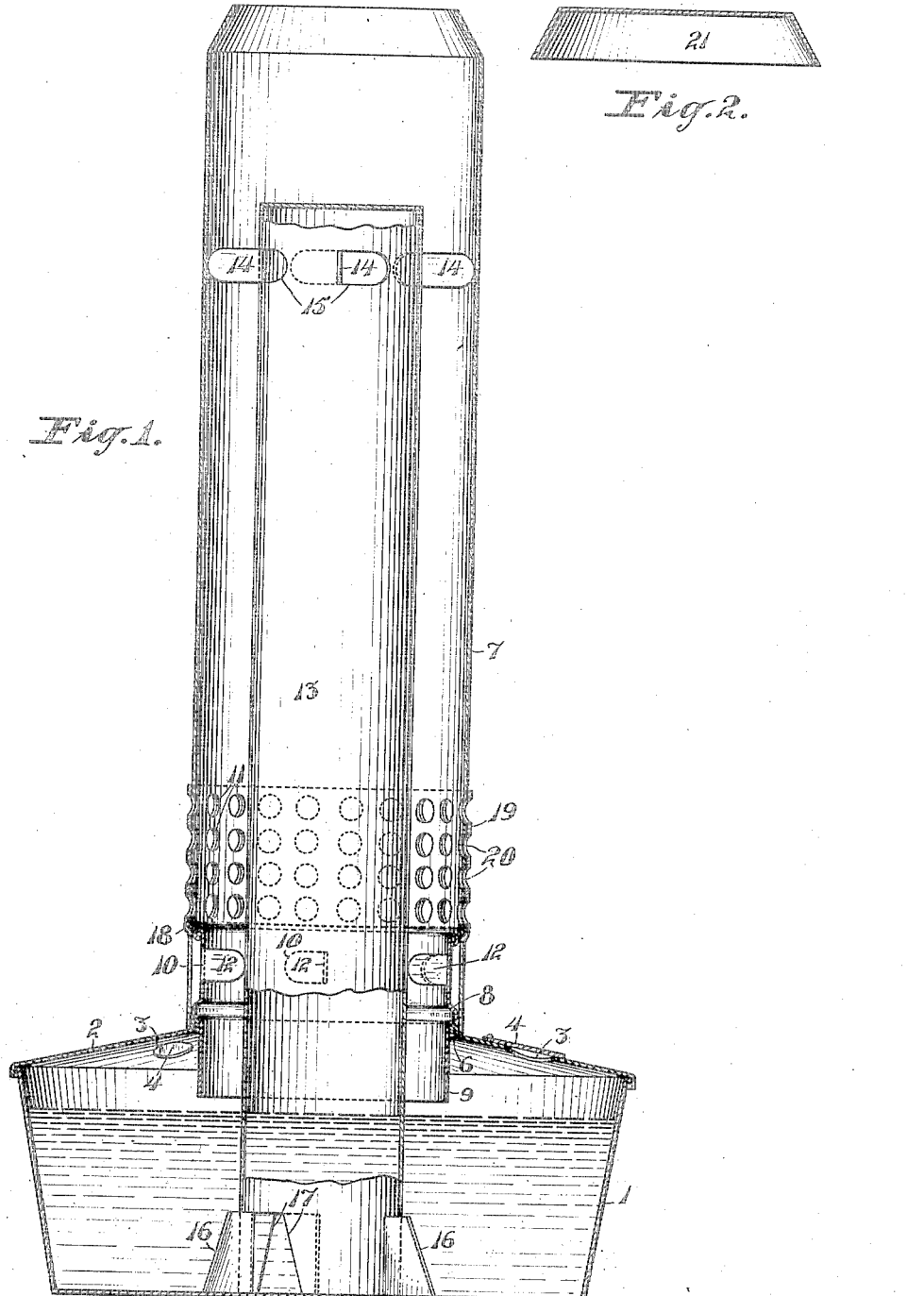

RUDOLPH PETER, OF SAN JOSE, CALIFORNIA.

ORCHARD-HEATER.

1,108,471.  Specification of Letters Patent.  Patented Aug. 25, 1914.

Application filed May 11, 1914. Serial No. 837,739.

*To all whom it may concern:*

Be it known that I, RUDOLPH PETER, a citizen of the United States, residing at San Jose, in the county of Santa Clara and State of California, have invented new and useful Improvements in Orchard-Heaters, of which the following is a specification.

My invention relates to improvements in orchard heaters in which the heat is produced by the combustion of mineral oil. In the use of such heaters, a great difficulty is generally encountered in that the more volatile constituents of the oil are burnt off first, leaving in the heater a tarry residue which is difficult to burn, and which is also difficult to remove from the heater.

The object of my invention is to provide an orchard heater in which the oil will be completely burned.

In the accompanying drawing, Figure 1 is a vertical section of our improved heater; Fig. 2 is a similar view of a cap therefor.

Referring to the drawing, 1 indicates a vessel for containing oil. On the upper edge of said vessel rests an annular cover 2 having a series of air holes 3 provided with pivoted shutters 4, by which they can be closed to any extent desired. The inner edge of the cover is bent upward, as shown at 6, and supported upon said cover around said upwardly bent edge is a cylindrical stack 7. Supported upon said upwardly bent edge is a bead 8 extending outwardly from a short cylindrical open-ended tube 9, the upper end of which is beaded outwardly and engages the lower portion of the stack, its lower edge being slightly below the top of the vessel 1. Said stack 7 immediately above said tube 9 is formed with circular series of apertures 11. Fingers 12 are cut out from the metal tube 9 on all sides except a vertical side leaving holes 10, and bent inwardly therefrom and having rounded inner free ends. These fingers serve to center in position a tube 13 which has a closed upper end and an open lower end resting upon the bottom of the vessel 1. Said tube 13 is also centered by means of fingers 14 cut out from the metal tube 13 on all sides except one vertical side and bent normally to said tube 13, leaving holes 15, and having rounded free outer ends contacting with the inner surface of the tube 7. At the bottom the tube 13 has portions 16 cut out therefrom on all except one vertical side and bent outwardly leaving holes 17, and resting on the bottom of the vessel around the tube 13.

The vessel 1 is filled with oil to a level slightly below the bottom of the tube 9 and is then ignited. The products of combustion pass up the stack, and air for supplying combustion enters by the holes 3. By reason of the air being compelled to flow downward around the lower edge of the tube 9, it comes into close contact with the surface of the oil. Nearly perfect combustion of the vapor of the oil takes place when the gases ascend past the apertures 11. The spacing of the tube 9 from the stack 7 is of importance, as otherwise the burning vapor of the oil would be too greatly cooled passing up from the vessel to the apertures 11. The insertion of the tube 13 within the stack 7 is instrumental in confining the products of combustion and unburnt vapors from the oil to a space in close proximity to the holes 11, through which holes air is supplied. The combustion of the oil raises the temperature of the tube 13 to a dull red heat, so that the vapors of the oil within the tube, in rising, are highly heated. Said highly heated vapors passing out of the tube 13 through the holes 15, and into the annular space between the tube 13 and stack 7, meet with air passing up in said space and with the flames of combustion of oil, and a perfect combustion of said vapors takes place, the products passing upward through the stack.

Combustion proceeds in substantially this manner until the level of the oil in the vessel 1 reaches the holes 17, when air is drawn in through said holes and combustion now takes place within the tube 13. If these holes 17 were not cut in the lower part of the tube 13, combustion would proceed but with the difference that, with the lowering of the oil level, less air would be drawn down to the surface of the oil, and it is especially important, on account of the thickened condition of the oil at this stage of the combustion thereof, that sufficient air is drawn down to the surface of the oil to afford combustion. By reason of the heating of the tube 13, and the holes 17 in its base, there is a down draft of air on to the surface of the oil and over said oil and into the tube. Simultaneously combustion takes place also in the annular space between the tubes 9 and 13 as before.

The cut-out portions 16 form heat conductors, which become heated by the flames, when the oil has been burnt down to the level of the tops of the heat conductors, so that the flames of the burning oil are in immediate contact therewith, and the heat thus taken up by the heat conductors is conducted downward thereby and given up to the oil at the lower levels. The heavy constituents of the oil being thus heated volatilize, and readily burn at the surface. As the level of the burning oil descends below the tops of the conductors they are still more highly heated by the ascending flames, so that a greater heat is conducted to the lower level, and hence, as the residuum of the oil becomes heavier, so also the heat applied thereto to volatilize it increases; so that eventually all of the oil is consumed.

On the tube 7 immediately below the aperture 11 is formed an outwardly extending circumferential bead 18, and resting on said bead and surrounding said tube 7 is a collar 19 having holes 20 which can register with the holes 11 in the tube 7. But by turning said collar 19 it may be made to close the holes 11, and by also closing the holes 3 with the shutters 4, and placing a cap 21 upon the top of the tube 11, the supply of air for combustion can be entirely cut off, and thus combustion arrested.

I claim:—

1. In combination with a vessel for containing oil, a stack communicating directly with the vessel for conducting away the products of combustion of the oil, and a tube within the stack extending upward from the lower portion of the vessel and having an opening near the top to permit the escape of the vapor generated from the oil in said tube.

2. In combination with a vessel for containing oil, a stack for conducting away the products of combustion of the oil, and a tube within the stack extending upward from the lower portion of the vessel and having a closed top and outwardly directed holes near the top to permit the escape of vapor generated from the oil in said tube.

3. In combination with a vessel for containing oil, a cover therefor, a stack communicating directly with the vessel for conducting away the products of combustion of the oil, and a tube within the stack, its lower portion being in the lower portion of the vessel and having a series of holes at the top.

4. In combination with a vessel for containing oil, a cover therefor, a stack for conducting away the products of combustion of the oil, a tube within the stack depending into said vessel, and heat conductors in said vessel extending sufficiently in height and length to conduct to the bottom of the vessel heat absorbed by their upper portions sufficient to completely vaporize oil in said bottom.

5. In combination with a vessel for containing oil, a stack for conducting away the products of combustion of the oil, and a vertically and outwardly extending heat conductor in said vessel extending from the bottom thereof to a considerable fraction of its height.

6. In combination with a vessel for containing oil, a stack for conducting away the products of combustion of the oil, a tube within the stack depending into said vessel, and a heat conductor in said vessel extending from the bottom thereof to a considerable fraction of its height.

7. In combination with a vessel for containing oil, a cover therefor, a stack on said cover, a tube within the stack, heat conductors at the bottom of the vessel, and a short tube supported upon the inner edge of the cover depending below the top of the vessel and extending upward above the top of the cover, and spaced from the inner tube, the stack having apertures immediately above said short tube.

8. In combination with a vessel for containing oil, a cover therefor, a stack on said cover, a tube within the stack, and a short tube supported upon the inner edge of the cover depending below the top of the vessel and extending upward above the top of the cover, and spaced from the inner tube, the stack having apertures immediately above said short tube.

9. In combination with a vessel for containing oil, a cover therefor, a stack on said cover, and a short tube supported upon the inner edge of the cover depending below the top of the vessel and extending upward above the top of the cover, the stack having apertures immediately above said short tube.

In testimony whereof I have hereunto set my hand in the presence of two subscribing witnesses.

RUDOLPH PETER.

Witnesses:
A. H. MACK,
E. M. FULLER.